US009704462B2

(12) United States Patent
Burmas

(10) Patent No.: US 9,704,462 B2
(45) Date of Patent: Jul. 11, 2017

(54) MUTABLE DIRECT BOX AND INTEGRATED PHANTOM-POWERED MUSIC INSTRUMENT TUNER

(71) Applicant: Sonic Nuance Electronics, LLC, Fremont, CA (US)

(72) Inventor: Theodore Vinko Burmas, Fremont, CA (US)

(73) Assignee: SONIC NUANCE ELECTRONICS, LLC, Fremont, CA (US)

( * ) Notice: Subject to any disclaimer, the term of this patent is extended or adjusted under 35 U.S.C. 154(b) by 0 days.

(21) Appl. No.: 15/140,397

(22) Filed: Apr. 27, 2016

(65) Prior Publication Data

US 2016/0240176 A1 Aug. 18, 2016

Related U.S. Application Data

(63) Continuation of application No. 14/473,119, filed on Aug. 29, 2014, now Pat. No. 9,355,629.

(Continued)

(51) Int. Cl.
*H04B 15/00* (2006.01)
*G10G 7/00* (2006.01)

(Continued)

(52) U.S. Cl.
CPC ................ *G10G 7/00* (2013.01); *G10G 7/02* (2013.01); *G10H 1/181* (2013.01); *G10H 1/44* (2013.01); *G10H 3/186* (2013.01); *G10H 2210/066* (2013.01); *G10H 2220/021* (2013.01); *G10H 2220/565* (2013.01); *G10H 2230/035* (2013.01); *G10H 2250/305* (2013.01)

(58) Field of Classification Search
CPC .... G10H 1/44; G10H 2220/021; G10H 1/181; G10H 2250/305; G10H 2210/066; G10H 2220/565; G10H 2230/035; G10G 7/02
USPC ........................................... 84/454; 381/94.5
See application file for complete search history.

(56) References Cited

U.S. PATENT DOCUMENTS 5,459,283 A * 10/1995 Birdwell, Jr. ........ G10H 1/0058 84/737
5,866,829 A * 2/1999 Pecoraro ................. G10H 1/32 84/177

(Continued)

*Primary Examiner* — Jeffrey Donels
(74) *Attorney, Agent, or Firm* — K&L Gates LLP; Jordan A. Kwan

(57) ABSTRACT

Apparatuses, systems and methods are presented which provide for a musical instrument direct box combined with a musical instrument tuner which may be phantom powered from an external audio system. In some embodiments, an apparatus is presented that includes a direct box (DI) module and a musical instrument tuner module coupled to the DI module. The instrument tuner module may be phantom powered based on connection to a remote system geographically distinct from the apparatus, and configured to measure the pitch of the instrument signal and mute the instrument signal simultaneously. In some example embodiments, the apparatus may also include a tuning transformer coupled to the musical instrument tuner module and the DI module, the tuning transformer configured to galvanically isolate a ground domain of the instrument signal from a ground domain of the remote system while the musical instrument tuner module measures the pitch of the musical instrument signal.

17 Claims, 5 Drawing Sheets

Related U.S. Application Data

(60) Provisional application No. 61/874,157, filed on Sep. 5, 2013.

(51) Int. Cl.

| | |
|---|---|
| ***G10H 1/44*** | (2006.01) |
| ***G10G 7/02*** | (2006.01) |
| ***G10H 1/18*** | (2006.01) |
| ***G10H 3/18*** | (2006.01) |

(56) References Cited

U.S. PATENT DOCUMENTS

| | | | | |
|---|---|---|---|---|
| 6,020,788 | A | 2/2000 | Comeau | |
| 6,215,055 | B1 * | 4/2001 | Saravis | G10H 1/348 84/422.1 |
| 6,965,067 | B2 | 11/2005 | Kondo | |
| 7,820,904 | B1 * | 10/2010 | Robling | G10H 1/348 84/600 |
| 8,334,449 | B2 | 12/2012 | Nielsen et al. | |
| 8,525,015 | B2 * | 9/2013 | Armstrong | G10H 1/348 381/118 |
| 8,779,273 | B2 * | 7/2014 | Han | G10H 3/18 84/725 |
| 2001/0035084 | A1 * | 11/2001 | Kulas | G10G 7/02 84/290 |
| 2006/0278068 | A1 * | 12/2006 | Nielsen | G10H 3/186 84/746 |
| 2011/0286612 | A1 * | 11/2011 | Cooper | H04H 60/04 381/123 |
| 2012/0008801 | A1 * | 1/2012 | Morrison | H03G 3/04 381/107 |
| 2012/0243379 | A1 | 9/2012 | Balli | |
| 2013/0327201 | A1 * | 12/2013 | Urry | G10H 1/06 84/626 |

* cited by examiner

MUTABLE DIRECT BOX AND INTEGRATED PHANTOM-POWERED MUSIC INSTRUMENT TUNER

CROSS REFERENCE TO RELATED APPLICATION

This application is a continuation of U.S. patent application Ser. No. 14/473,119, titled "MUTABLE DIRECT BOX AND INTEGRATED PHANTOM-POWERED MUSIC INSTRUMENT TUNER," filed on Aug. 29, 2014, which claims the benefit of U.S. Provisional Application Ser. No. 61/874,157, titled "PHANTOM-POWERED MUSIC INSTRUMENT TUNER AND MUTABLE DIRECT BOX," filed on Sep. 5, 2013, the entire contents and substance of which are hereby incorporated in total by reference in their entireties and for all purposes.

TECHNICAL FIELD

The subject matter disclosed herein generally relates to audio signal processing components for musical instrument performance. In some example embodiments, the present disclosures relate to systems and methods for connecting a musical instrument to a direct box coupled with an instrument tuner to measure the frequency content of the instrument's output signal.

BRIEF DESCRIPTION OF THE DRAWINGS

Some embodiments are illustrated by way of example and not limitation in the figures of the accompanying drawings.

DETAILED DESCRIPTION

Figure 1:
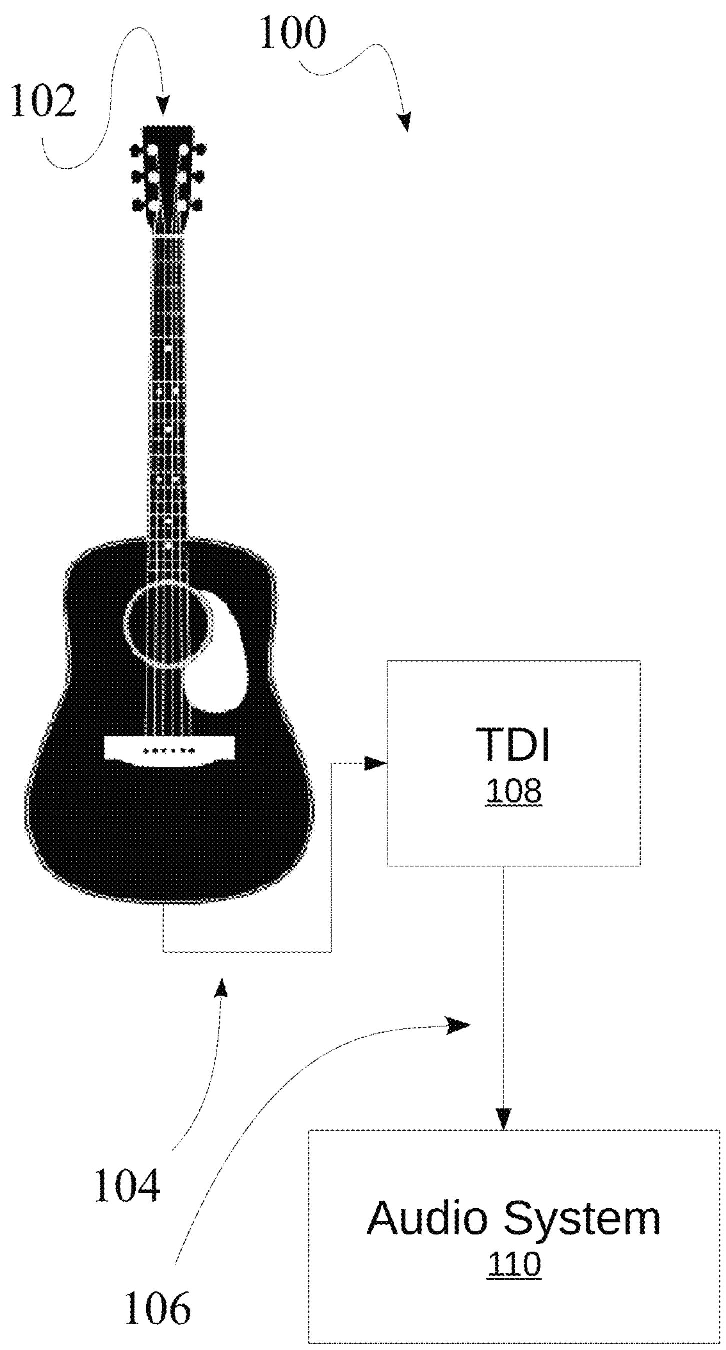
FIG. 1 shows a typical application of an integrated tuner-direct box unit (TDI), according to some embodiments.

A direct box (hereafter referred to as a "DI unit") can refer to a device that permits a user to interface high impedance single-ended source signals like those from acoustic, electric or bass guitars or keyboards with professional low impedance audio systems (such as personal address and recording systems). The high impedance single-ended instrument signal may be prone to signal degradation due to both the RC lowpass filtering of the cable as well as electromagnetic coupling.

The DI unit's conversion of high impedance single-ended signals to low-impedance differential signals can enable an audio system to avoid or at least reduce such signal degradation. For example, one feature of having differential signals can be the rejection of common-mode interference by the audio system which ideally amplifies only the differential signal. In addition, the low impedance output of the DI unit can further improve immunity to electromagnetic interference and can reduce the RC lowpass filtering affect.

DI units can also provide a "ground lift" feature, meaning the ability to separate the ground domains of the input and output signals, thereby providing the ability to sever so called "ground loops" and can remove the hum injected into the audio system caused by them. "Ground loops" can refer to a current flowing between two ground locations in a system due to an unwanted voltage potential between them.

The DI unit may connect to a three conductor interface which transmits a signal differentially to the audio system and may accept DC power single-endedly from the audio system. In an example embodiment of the present disclosure, the method of transmitting power from the audio system to the DI unit may be referred to as "phantom power." Phantom power can refer to a power source that is provided on the common-mode signal path of a differential connection between a DI unit and an audio system. This power source was intended in the early days of professional audio to remotely power condenser type microphones and is defined in the international standard IEC 61938. This power source can be used to power items in embodiments of the present disclosure.

An electronic musical instrument tuner (hereafter referred to as a "tuner") can provide a means for measuring an instrument's output signal frequency content, comparing it to a set of reference frequencies and displaying the difference to the user. The user can use this information to accurately modify the pitch of the instrument's strings (or keys, or whatever is being tuned) until the desired accuracy is achieved.

It would be desirable for a user to have a single unit with both DI and tuner functionality. For example, a musician having just a single combined DI and tuner unit would be able to bring less equipment to a performance, have a more durable unit due to not having to interconnect the DI and tuner and potentially reduce the overall space and weight.

In addition, it would be desirable for this single unit to be phantom powered. For example, the musician may not need to bring batteries or other power sources and not need to deal with the associated issues of having batteries lose capacity and finding a power receptacle for the single unit.

However, many users utilize a combination of a DI unit and an electronic instrument tuner as two or more separate devices, at least one of which is not phantom powered. Due to the low dc current specification for phantom power of the audio system, combining a direct box and musical instrument tuner to run off of this power source is difficult and is not normally achieved this way in the industry. Typical problems are that the low power specification of the phantom power of the audio system limits the types of tuner, display and DI unit approaches that can be implemented, as tuners, displays and DI units typically demand higher power draws. In addition, due to non-idealities in the audio system, common mode electronic noise caused by the combination of a tuner and a DI could potentially be converted to a differential signal and amplified by the audio, creating unwanted noise and preventing a tuner from providing accurate readings.

Aspects of the present disclosure (referred to as a "TDI" for "Tuner DI") can allow for combining the functions of the DI unit with the tuner, which may be powered from the audio system's phantom power and may still function while the ground is lifted. In other words, aspects of the present disclosure can allow for a single unit with DI and tuner functionality that can also be phantom powered, resolving many or all of the deficiencies common in industry, discussed previously, among other issues. In some example embodiments, the phantom-powered combined DI and tuner unit can allow for the following features: a) convenience of multiple functions in one unit in terms of compactness, durability and shorter setup time, b) assurance that the TDI unit will not lose power unless the overall audio system does, c) no need to purchase batteries, which can lose capacity during a performance, d) the ability to unplug the instrument when the TDI is muted to save the battery power of the instrument (musical instruments that contain preamps often only draw power when the instrument is connected to a cable) and e) the ability to connect or disconnect the audio system to the TDI with minimal audible artifacts, such as popping or crackling.

Referring to FIG. 1, illustration 100 shows an example scenario for utilizing aspects of the present disclosure. Illustration 100 includes a musical instrument 102 with a single-ended output signal 104 driving a TDI 108. Examples of instrument 102 can include an electric or acoustic guitar, bass guitar, etc. The TDI 108 can be powered by an audio system 110 via a low-impedance differential interface 106. The audio system 110 could be an audio mixing board, a personal address or recording system for example. When used in context with the system in the illustration 100, the TDI 108 can provide the functions of a DI unit combined with a musical instrument tuner powered from the audio system it connects to, according to some example embodiments. The TDI 108 can also be phantom powered in the sense that it is being powered by the audio system that may be located far away and may also have a different ground potential.

In conventional setups for using a DI and tuner, such as in a musical performance on a stage or a studio, the DI and the tuner would normally be in separate units, both of which may not be phantom powered. This is because of the difficulty of performing the DI and/or tuner functions with such low power consumption due to the phantom power specification, as well as the difficulty of processing the input signal when the ground potential is different from the audio system that the conventional units run into, as may happen when the audio system is located remotely from the DI and tuner. However, aspects of the present disclosure can resolve these and other problems, allowing for the DI and tuner to be combined into the example TDI 108 and can be phantom powered via the audio system 110. Further details about the TDI 108 will be described more, below.

Figure 2:
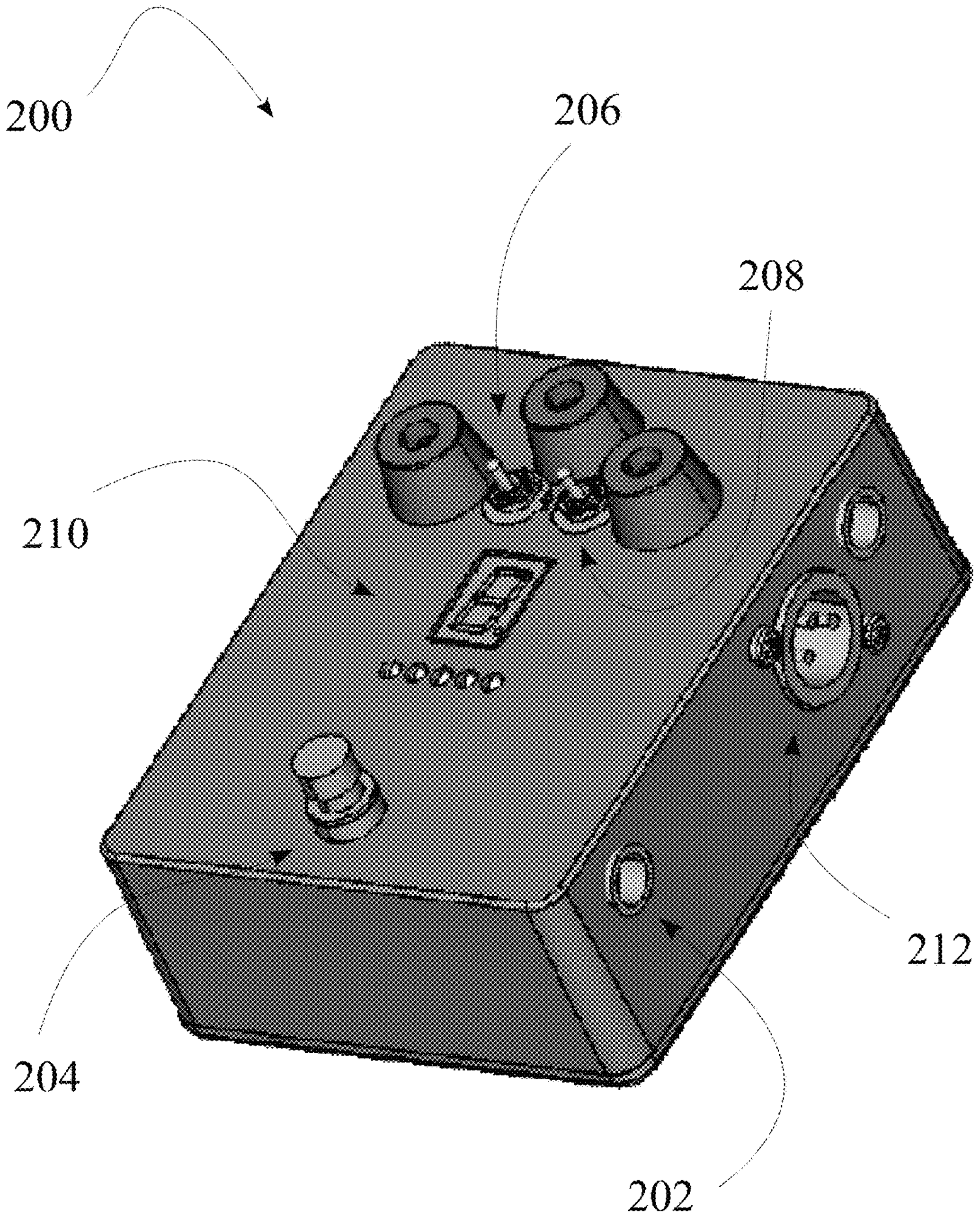
FIG. 2 shows a picture of a TDI apparatus, according to some embodiments.

Referring to FIG. 2, illustration 200 shows an example of the TDI 108, according to some example embodiments. Illustration 200 contains an instrument input 202, a mute control 204, a display 210, a ground lift control 206, a power control 208 and a low-impedance balanced output 212. The embodiment shown in FIG. 2 can be a floor-mounted unit affording the user hands-free operation. The instrument input 202 can accept various instrument cables, such as a cable input from an electric guitar. The instrument input 202 can convert the instrument's ground potential to that of the TDI 108 to allow for further processing. The mute control 204 can be a switch that can be toggled to enable or disable sound from the instrument connected to the input 202. The mute control 204 can typically be used when tuning the instrument, as an audience would not normally want to hear tuning being conducted. This mute control may be momentary or latching, meaning either the mute can be controlled manually or locked into place, and can allow the user to control when the instrument signal is sent to the audio system. The display 210 can show the user what note or pitch the tuning is being calibrated to. This display 210 may take several forms such as an analog meter and/or a digital display. The display can represent the interface to the user to communicate information about the tuning level. In some example embodiments, the display 210 can also include additional lights to signal a degree of how sharp or flat the instrument signal is compared to the tuned note or pitch. For example, the display 210 can show a digital display of "A," "B," "C," and so on up to "G#," to indicate what note is being played for tuning. In addition, the display 210 can include a series of lights arranged in a row that may turn on to indicate how sharp or flat the tuned instrument is compared to the fixed reference note. In some cases, only one light in the row may turn on at a time, while in other cases more than one light can turn on at once to indicate even finer degrees of pitch.

In some example embodiments, the ground lift control 206 gives the user the ability to sever the connection between the grounds of the TDI 108 and the audio system 110, thereby breaking so called "ground loops" and potentially eliminating the audible hum that they cause. The power control 208 can aid in reducing audible popping when connecting the TDI 108 to the audio system. When the TDI 108 begins consuming current from the audio system's phantom power, it can cause audible pops if the time allowed for this is not controlled. The power control 208 can give a degree of freedom for this control.

Figure 3:
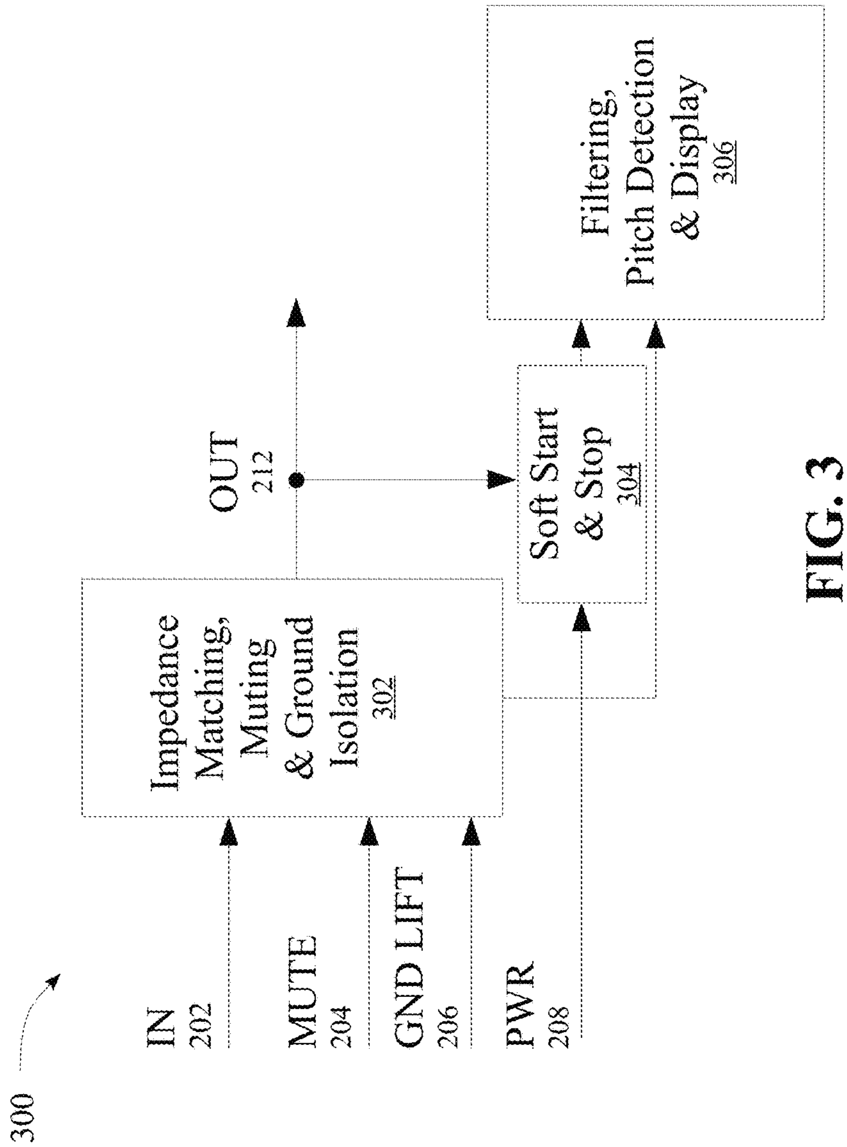
FIG. 3 shows a block diagram of an example embodiment a TDI.

Referring to FIG. 3, Illustration 300 shows a functional block diagram according to some example embodiments. Note that many of the signals or objects are the same as in FIG. 2, and are denoted using the same reference numbers. The input signals IN 202, MUTE 204 and GND LIFT 206 drive an Impedance Matching, Muting and Ground Isolation block 302. Block 302 can be configured to perform the DI functionality of the TDI 108, such as impedance matching, which can take the potentially high impedance of the instrument signal at 202 and convert the instrument signal to a low impedance output signal 212, thereby allowing the instrument signal to travel long distances with less chance for interference coupling and cable losses. The muting performed by block 302 can allow the user to control the amplitude of the signal sent to the audio system, allowing the user to unplug the instrument with reduced audio artifacts such as popping. The ground isolation functionality of block 302 can aid in reducing audio hum in the audio system by separating the ground potential of the TDI 108 and the audio system. The power control signal PWR 208, along with the output 212 drive a Soft Start and Stop block 304 to help control the rate of current consumption when the TDI 108 is connected to the audio system 110. The outputs of blocks 302 and 304 feed a Filtering, Pitch Detection and Display block 306.

Block 306 can be configured to perform the tuner functionality of the TDI 108. For example, block 306 can filter the input signal 202 to slow the changing of the display information, thereby making it easier to read for the user. In some example embodiments, the pitch detection performed by block 306 is the computation engine that processes the input signal to calculate the pitch and accuracy with respect to a fixed reference, e.g., the pitch of a note. In addition, due to non-idealities in the audio system, common mode electronic noise caused by the combination of a tuner and a DI could potentially be converted to a differential signal and amplified by the audio. Filtering Pitch Detection & Display block 306 can reduce this problem by keeping the average current draw steady and slowly varying the change in current draw. In some example embodiments, this can be accomplished by pulse width modulation to modulate the average current. For example, when the display 210 changes due to displaying different notes, the current draw can change because more or fewer digital elements in display 210 will be lit up, e.g., changing from displaying note "A" to note "B." Pulse width modulation, controlled by block 306, can adjust for these changes in current draws by changing the frequency at which the display stays on.

In some example embodiments, the soft start & stop block 304 can reduce noise artifacts caused by powering on the TDI 108 in two different scenarios. In one case, the TDI 108 may be powered off (e.g. power switch 208 is disengaged) and then connected to the audio system 110. Normally, this may cause some unwanted noise such as popping. The block 304 can mitigate this by reducing the loading caused by the capacitive charging of the TDI 108 when connecting to the ground of audio system 110. In another case, the TDI 108 may already be connected to the audio system 110 but may be initially powered off, and then may be powered on. Normally, powering on the TDI 108 in this case may also cause unwanted noise such as popping. The block 304 can mitigate this by slowing powering on the TDI 108 when the power switch 208 is engaged. In addition, block 304 can reduce this popping upon shutdown by slowly discharging the capacitance of the TDI 108.

In some example embodiments, block 304 can include soft start and stop circuitry. In some others, block 304 can also include circuitry to reduce the capacitive loading of the unpowered TDI 108 with respect to the audio system 110's ground domain. The reduction of the capacitive loading of the unpowered TDI 108 with respect to the audio system 110's ground domain can allow for reducing audible artifacts such as popping or cracking when interconnection between the TDI 108 and the audio system 110 is made.

After power up, the TDI 108 can begin processing the input signal 202. The TDI 108 can be in one of several modes of operation controlled by the MUTE signal 204. For example, the TDI 108 can be operated to tune the instrument connected via input signal 202 while the output 212 is muted. As another example, the TDI 108 can be operated to not be tuning, and may transmit the sound from input signal 202 through output 212.

Figure 4:
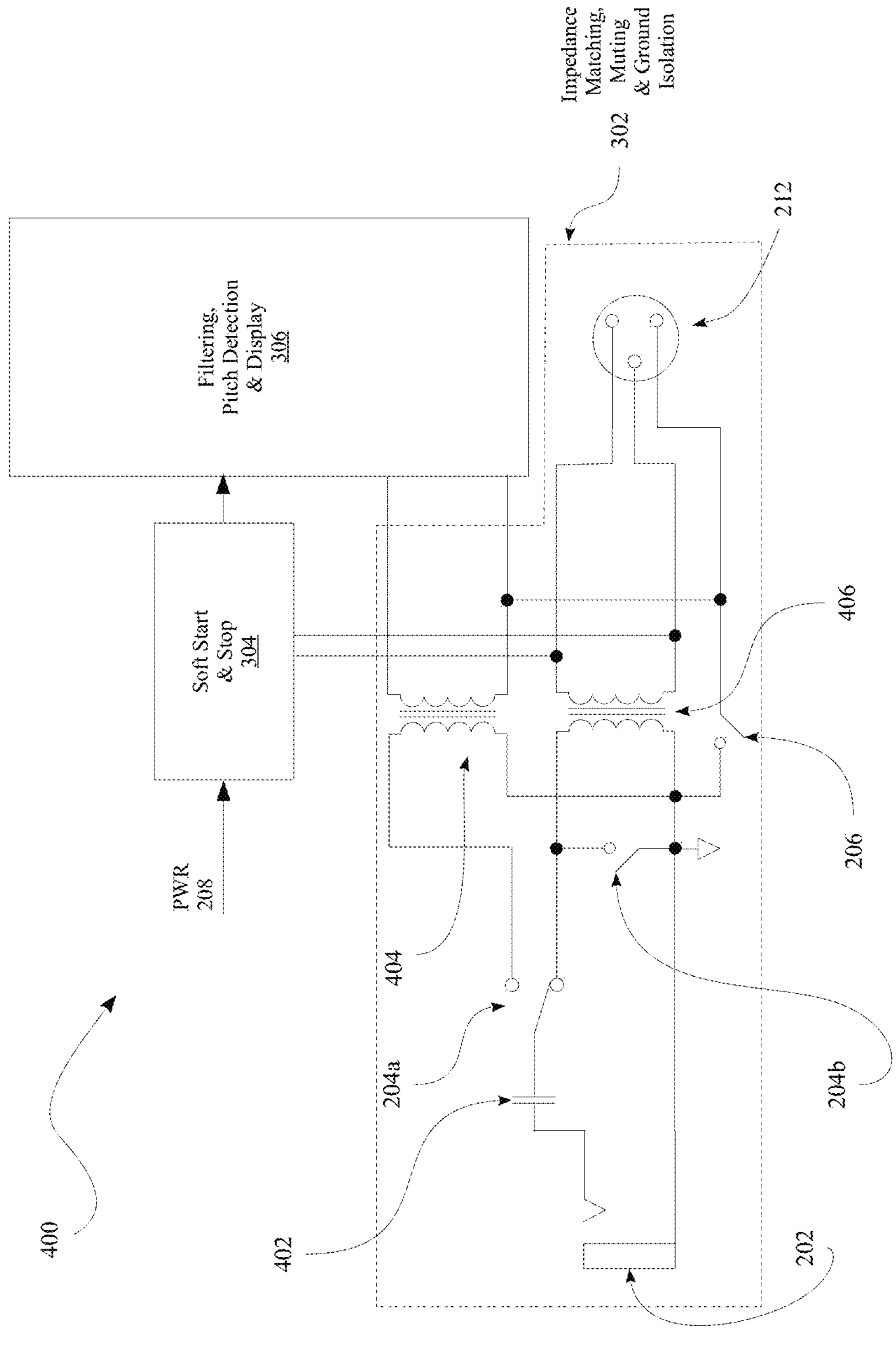
FIG. 4 shows a schematic diagram of an example embodiment of the TDI, according to some aspects of the present disclosure.

Referring to FIG. 4, illustration 400 shows a schematic diagram according to some example embodiments. Schematic 400 contains the IN signal 202 driving a dc-blocking capacitor 402. The MUTE switch 204 may have two components (204*a* and 204*b*) which can switch in unison. A transformer 406 can provide the high-impedance single-ended transformation to a low-impedance fully-differential output to the three conductor output 212. The transformer 406 in conjunction with the GND lift switch 206 provides a means for IN/OUT ground isolation (e.g., instrument signal input 202 to audio system output 212). As the IN signal 202 may contain a dc voltage, the dc voltage may be removed via the capacitor 402 to aid the mute capability and reduce the distortion it could cause in the transformer. The Impedance Matching, Muting and Ground Isolation block 302 also can contain a dedicated transformer 404 which can provide a ground isolated version of the IN signal 202 to the Filtering, Pitch Detection and Display block 306 when the MUTE switch 204 is engaged. The Soft Start and Stop block 304 can provide a means to slowly power up and power down the TDI 108 controlled by the PWR switch 208. The Soft Start and Stop block 304 may be implemented by using a switch with multiple hardware time constants for startup and shutdown. Other approaches include but are not limited to using electromechanical and/or solid state relays with delayed turn-on and turn-off times.

In some example embodiments, when the MUTE control signal 204 is disengaged by the user, the output signal is sent to the audio system and the tuning circuitry may be disabled to save power. Switches 204*a* and 204*b* are shown in this mode in illustration 400, where the input signal 202 is sent through the dc-blocking capacitor 402 and into the step-down transformer 406. This transformer 406 can provide the high to low impedance matching, ground isolation and single ended to differential conversion functions. Due to the possible need for ground isolation via the GND LIFT 204 switch, the input signal's ground domain can be separated from the Filtering, Pitch Detection and Display 306 ground domain.

When the MUTE signal 204 is engaged by the user, the output signal OUT 212 may be muted going to the audio system 110 and allow the user to silently check the pitch accuracy of the instrument connected to IN 202. An example way of implementing this can be achieved by the ganged switches 204*a* & 204*b* sending the input signal through the dc blocking capacitor 402 to the tuning transformer 404 and shorting the input to the DI output transformer 406 by engaging switch 204*b*. Ganged switches 204*a* and 204*b* can allow for switching between the instrument signal passing to the tuner or to the audio system, as well as allow for muting the output signal of the instrument directed to the audio system during tuning. This signal going to the Filtering, Pitch Detection and Display 306 block may be filtered using common techniques such as analog active, passive and digital filtering.

Transformer 404 can provide ground isolation between the instrument input and the Filtering, Pitch Detection and Display 306 block. In some example embodiments, by toggling the ground lift control 206, the transformer 404 can either be configured to galvanically isolate the ground domains of the audio system and the instrument, or connect them together. When the transformer 404 galvanically isolates the ground domains, transformer 404 can allow for the input signal 202 to traverse different ground domains without physical connection, thereby allowing the phantom power from the remote audio system 110 to still reach the tuner's active circuitry of the TDI 108 while the ground loop is severed to minimize noise that would disrupt the tuning. The absence of transformer 404 can leave the pitch detection susceptible to ground loop interference, thereby corrupting the tuning measurement. Transformer 404 may typically not be included in conventional setups because the tuning functionality is normally performed on the instrument side, rather than being phantom powered by a remote system that has a different ground potential. Therefore, there is normally a lack of need or motivation to adjust for ground looping when dealing with instrument tuners. However, transformer 404, being coupled to pitch detection block 306 and the instrument input 202, can allow for both the tuning functionality with phantom powering and the direct box functionality in the same device, as shown according to aspects of the present disclosure. In some example embodiments, additional circuitry can be included between the instrument input 202 and the transformer 404, such as for example, the dc block capacitor 402 and the ganged switches 204*a* & 204*b*, without loss of functionality with transformer 404.

The combination of the muted output transformer 406 and the tuning transformer 404 can allow the tuner to perform pitch detection on the input accurately even in the presence of a ground loop and be virtually silent to the audio system 110. For example, in some example embodiments, an absence of the transformer 406 may cause unwanted noise artifacts, such as popping, when switching from the tuning functionality to the playmode functionality. The inclusion of the transformer 406 coupled to the audio system 110, via balanced output 212, and to the instrument input 202, or in other cases, ground, can reduce or even eliminate the unwanted noise artifacts due to maintaining a low impedance output, which is less susceptible to noise pickup. In addition, the transformer 406 can also provide a stable low impedance output for balanced output 212, thereby reducing or even eliminating noise caused by charging and discharging capacitance that balanced output 212 may otherwise experience. The pitch detection function can measure the difference of frequency from the musical instrument's output signal 202 from an ideal frequency reference. Many pitch detection techniques are available to those skilled in the art in the frequency and time domains such as monophonic, polyphonic and stroboscopic pitch detection and can be implemented in the analog and/or digital domains.

As a fast current draw coupled with imperfections in the audio system can create unwanted audible artifacts, an approach has been developed to mitigate this. In some example embodiments, the approach combines pulse width modulation, digital filtering and slowing display transitions to dramatically reduce the audible artifacts. These approaches attempt to keep the average current draw constant over the operation of the TDI 108. Other approaches include using lower power display technologies, low-power microprocessors, wireless transmitter to an external display/processor, an externally powered display as well as other approaches, and embodiments are not so limited.

In some example embodiments, the present disclosure can be implemented in multiple ways, such as: an active impedance transformation circuit (also known as an "active DI unit"), a combination of active and passive impedance transformation circuits, an externally attached musical instrument tuner computation engine such as a computer, a mobile device, a wireless transmission of the tuning information, a stroboscopic instrument tuner and/or a polyphonic musical instrument tuner, as examples.

Figure 5:
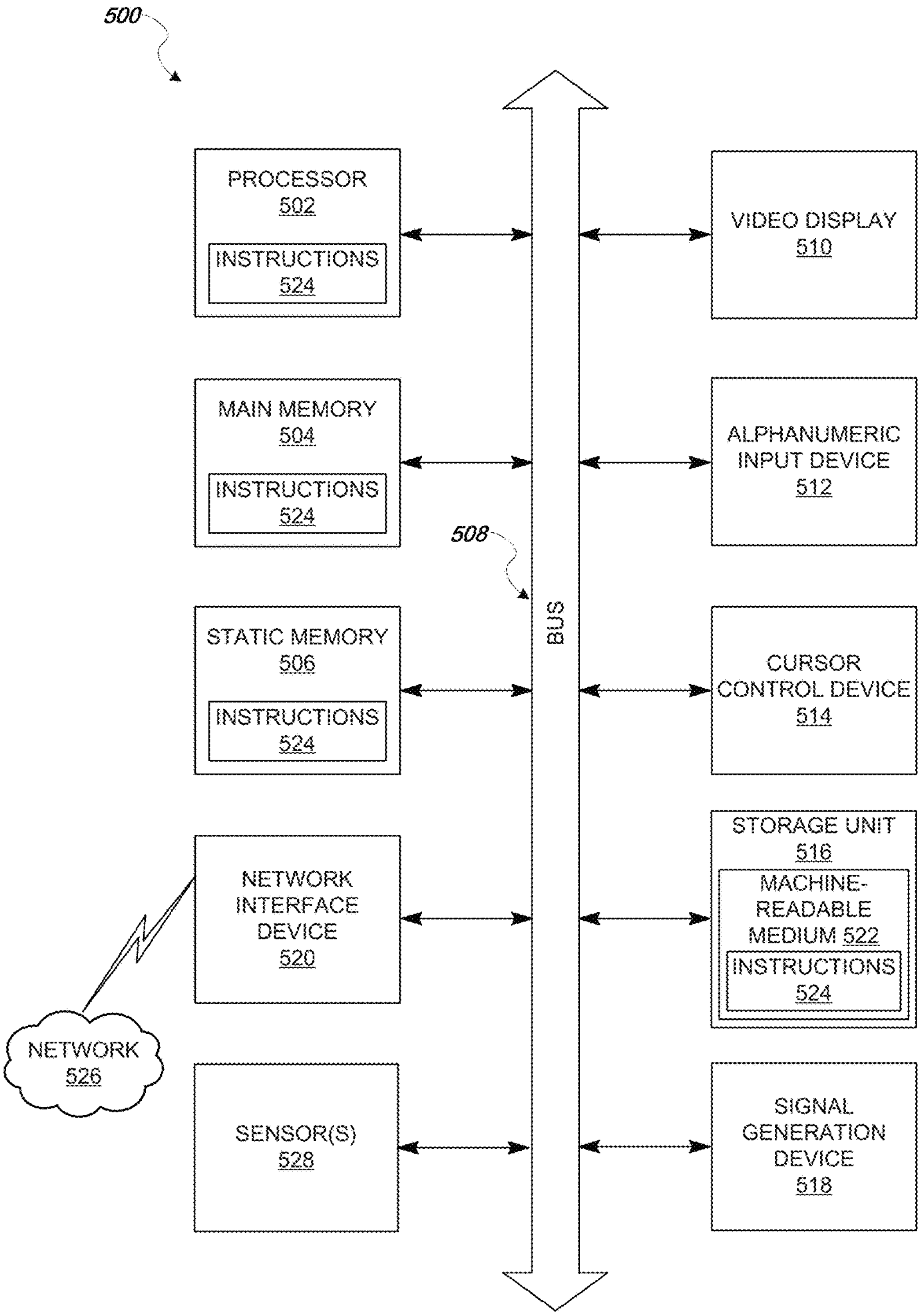
FIG. 5 is a block diagram illustrating components of a machine, according to some example embodiments, able to read instructions from a machine-readable medium and perform any one or more of the methodologies discussed herein.

Referring to FIG. 5, the block diagram illustrates components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an applet, an app, or other executable code) for causing the machine 500 to perform any one or more of the methodologies discussed herein may be executed, in whole or in part.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may include hardware, software, or combinations thereof, and may as examples be a server computer, a client computer, a personal computer (PC), a tablet computer, a laptop computer, a netbook, a cellular telephone, a smartphone, a STB, a PDA, a web appliance, a network router, a network switch, a network bridge, or any machine capable of executing the instructions 524, sequentially or otherwise, that specify actions to be taken by that machine. Further, while only a single machine 500 is illustrated, the term "machine" shall also be taken to include any collection of machines 500 that individually or jointly execute the instructions 524 to perform all or part of any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524, such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include one or more sensors 528, suitable for obtaining various sensor data. The machine 500 may further include a video display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-readable medium 522 (e.g., a tangible and non-transitory machine-readable storage medium) on which are stored the instructions 524 embodying any one or more of the methodologies or functions described herein, including, for example, any of the descriptions of FIGS. 1-4. The instructions 524 may also reside, completely or at least partially, within the main memory 504, within the processor 502 (e.g., within the processor's cache memory), or both, before or during execution thereof by the machine 500. The instructions may also reside in the static memory 506.

Accordingly, the main memory 504 and the processor 502 may be considered machine-readable media 522 (e.g., tangible and non-transitory machine-readable media). The instructions 524 may be transmitted or received over a network 526 via the network interface device 520. For example, the network interface device 520 may communicate the instructions 524 using any one or more transfer protocols (e.g., Hypertext Transfer Protocol (HTTP)). The machine 500 may also represent example means for performing any of the functions described herein, including the processes described in FIGS. 1-4.

In some example embodiments, the machine 500 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 522 able to store data temporarily or permanently and may be taken to include, but not be limited to, RAM, read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions 524. The term "machine-readable medium" shall also be taken to include any medium, or combination of multiple media, that is capable of storing the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 522 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 502 or other programmable processor 502. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 502 configured by software to become a special-purpose processor, the general-purpose processor 502 may be configured as respectively different special-purpose processors (e.g., comprising different hardware modules) at different times. Software (e.g., a software module) may accordingly configure one or more processors 502, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions described herein. As used herein, "processor-implemented module" refers to a hardware module implemented using one or more processors 502.

Similarly, the methods described herein may be at least partially processor-implemented, with a processor 502 being an example of hardware. For example, at least some of the operations of a method may be performed by one or more processors 502 or processor-implemented modules. As used herein, "processor-implemented module" refers to a hardware module in which the hardware includes one or more processors 502. Moreover, the one or more processors 502 may also operate to support performance of the relevant operations in a "cloud computing" environment or as a "software as a service" (SaaS). For example, at least some of the operations may be performed by a group of computers (as examples of machines 500 including processors), with these operations being accessible via a network 526 (e.g., the Internet) and via one or more appropriate interfaces (e.g., an API).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 500. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 500 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An apparatus comprising:

a direct box (DI) module configured to interface a musical instrument signal to an audio system;

an electric musical instrument tuner module coupled to the DI module and configured to measure a pitch of the musical instrument signal; and a tuning transformer coupled to the musical instrument tuner module and the DI module, the tuning transformer configured to galvanically isolate a ground domain of the instrument signal from a ground domain of the remote system while the musical instrument tuner module is configured to measure the pitch of the musical instrument signal;

wherein the instrument tuner module is phantom powered via a connection to a remote system geographically distinct from the apparatus.

2. The apparatus of claim 1, further comprising:

a muted output transformer coupled to a musical instrument input and an output to the audio system and configured to provide a stable low impedance signal for balanced output to the output to the audio system.

3. The apparatus of claim 2, wherein the tuning transformer and the muted output transformer are further configured to reduce signal noise during a muting functionality of the apparatus.

4. The apparatus of claim 1, further comprising a soft start and stop module coupled to the DI module and the electric musical instrument tuner module and configured to:

gradually power on the apparatus when the apparatus is already connected to the audio system; and gradually discharge capacitance of the apparatus during a shutdown procedure.

5. The apparatus of claim 4, wherein the soft start and stop module is further configured to reduce capacitive loading of the apparatus while powered off with respect to a ground domain of the audio system.

6. The apparatus of claim 1, wherein the electric musical instrument tuner module includes a display configured to:

display a reference pitch to be compared against the musical instrument signal; and display an indication of a deviation of the musical instrument signal away from the reference pitch.

7. The apparatus of claim 6, wherein the display is configured to be power balanced as the display changes.

8. A method comprising:

interfacing, by a device, a musical instrument signal to an audio system, the audio system being located remotely from the device and the device being phantom powered by the audio system;

measuring, by the device, a pitch of the musical instrument signal; and galvanically isolating a ground domain of the instrument signal from a ground domain of the audio system while measuring the pitch of the musical instrument signal.

9. The method of claim 8, further comprising:

providing a stable low impedance signal for balanced output to the output of the device to the audio system.

10. The method of claim 9, further comprising reducing signal noise during a muting function of the device.

11. The method of claim 8, further comprising:

gradually powering on the device when the device is already connected to the audio system; and gradually discharging capacitance of the device during a shutdown procedure of the device.

12. The method of claim 11, further comprising reducing capacitive loading of the device while powered off with respect to a ground domain of the audio system.

13. The method of claim 8, further comprising:

displaying, in a display of the device, a reference pitch to be compared against the musical instrument signal; and displaying, in the display of the device, an indication of a deviation of the musical instrument signal away from the reference pitch.

14. The method of claim 13, wherein the display is configured to be power balanced as the display changes.

15. A computer-readable medium having no transitory signals and embodying instructions that, when executed by a processor of a machine residing in a device, cause the machine to perform operations comprising:

interfacing a musical instrument signal to an audio system, the audio system being located remotely from the device and the device being phantom powered by the audio system;

measuring a pitch of the musical instrument signal;

gradually powering on the device when the device is already connected to the audio system; and gradually discharging capacitance of the device during a shutdown procedure of the device.

16. The computer-readable medium of claim 15, wherein the operations further comprise:

providing a stable low impedance signal for balanced output to the output of the device to the audio system; and reducing signal noise during a muting function of the device.

17. The computer-readable medium of claim 15, wherein the operations further comprise:

displaying a reference pitch to be compared against the musical instrument signal; and displaying an indication of a deviation of the musical instrument signal away from the reference pitch.

* * * * *